United States Patent
Baidak et al.

(10) Patent No.: US 10,358,534 B2
(45) Date of Patent: Jul. 23, 2019

(54) ENGINEERED CROSSLINKED THERMOPLASTIC PARTICLES FOR INTERLAMINAR TOUGHENING

(71) Applicant: CYTEC TECHNOLOGY CORP., Wilmington, DE (US)

(72) Inventors: Alexandre A. Baidak, Cleveland (GB); Patrick Terence McGrail, Mickleby (GB)

(73) Assignee: CYTEC TECHNOLOGY CORP., Wilmington, DE (US)

( * ) Notice: Subject to any disclaimer, the term of this patent is extended or adjusted under 35 U.S.C. 154(b) by 0 days.

(21) Appl. No.: 15/390,812

(22) Filed: Dec. 27, 2016

(65) Prior Publication Data

US 2017/0121470 A1    May 4, 2017

Related U.S. Application Data

(62) Division of application No. 12/787,719, filed on May 26, 2010, now Pat. No. 9,567,426.

(60) Provisional application No. 61/182,302, filed on May 29, 2009.

(51) Int. Cl.
| | |
|---|---|
| *C08J 3/24* | (2006.01) |
| *C08G 59/50* | (2006.01) |
| *C08L 63/00* | (2006.01) |
| *C08G 75/23* | (2006.01) |
| *C08L 81/06* | (2006.01) |

(52) U.S. Cl.
CPC .............. *C08J 3/24* (2013.01); *C08G 59/504* (2013.01); *C08G 75/23* (2013.01); *C08L 63/00* (2013.01); *C08J 2381/06* (2013.01); *C08L 81/06* (2013.01); *Y10T 428/249933* (2015.04)

(58) Field of Classification Search
None
See application file for complete search history.

(56) References Cited

U.S. PATENT DOCUMENTS

| | | | |
|---|---|---|---|
| 3,410,936 A | 11/1968 | Juras | |
| 4,656,207 A | 4/1987 | Jabloner | |
| 5,051,469 A | 9/1991 | Udipi | |
| 5,189,116 A | 2/1993 | Boyd et al. | |
| 5,368,922 A * | 11/1994 | Portelli ....................... | C08J 5/24 442/149 |
| 5,756,597 A | 5/1998 | Boyd et al. | |
| 6,265,491 B1 | 7/2001 | Carter | |
| 6,531,568 B1 | 11/2003 | Shibuya | |
| 7,192,634 B2 * | 3/2007 | Carter ......................... | C08J 3/24 252/511 |
| 7,847,024 B2 * | 12/2010 | Worley, II ............... | C08L 53/02 525/241 |
| 2002/0068805 A1 * | 6/2002 | Futami .................. | C08F 257/02 526/307.5 |
| 2004/0041128 A1 * | 3/2004 | Carter ......................... | C08J 3/24 252/500 |
| 2004/0228971 A1 * | 11/2004 | Scaramuzzino ......... | B05D 3/10 427/299 |
| 2006/0009579 A1 * | 1/2006 | Miyawaki .............. | C08F 283/10 525/31 |
| 2006/0057331 A1 * | 3/2006 | Lucas ....................... | B32B 3/12 428/117 |
| 2006/0204686 A1 * | 9/2006 | Missell .................. | B41M 5/502 428/32.34 |
| 2006/0292375 A1 | 12/2006 | Martin | |
| 2007/0055018 A1 * | 3/2007 | Achten ...................... | C08F 8/44 525/192 |
| 2007/0096056 A1 * | 5/2007 | Takeuchi .............. | C08F 283/10 252/299.01 |
| 2007/0129493 A1 * | 6/2007 | Sahnoune ............... | C08L 23/10 525/191 |
| 2007/0196619 A1 | 8/2007 | Carter | |
| 2007/0267609 A1 * | 11/2007 | Ratzsch .................. | B27N 3/005 252/607 |
| 2009/0151860 A1 * | 6/2009 | Carter ......................... | C08J 3/24 156/148 |
| 2010/0222461 A1 | 9/2010 | Bongiovanni et al. | |
| 2010/0305239 A1 * | 12/2010 | Wei ..................... | C08G 59/3227 524/35 |
| 2011/0034591 A1 * | 2/2011 | Cawse ............... | C08G 59/3227 523/400 |
| 2011/0040047 A1 | 2/2011 | Worley et al. | |
| 2011/0048637 A1 | 3/2011 | Kohli | |
| 2012/0164455 A1 | 6/2012 | Griffin et al. | |
| 2014/0170408 A1 | 6/2014 | Frulloni | |
| 2015/0166743 A1 | 6/2015 | Restuccia | |

FOREIGN PATENT DOCUMENTS

| | | |
|---|---|---|
| JP | 2001-114915 | 4/2001 |
| JP | 2008-231395 | 10/2008 |
| WO | 2009/057049 | 5/2009 |

OTHER PUBLICATIONS

ISR for PCT/GB2010/001062 dated Jul. 29, 2010.

* cited by examiner

*Primary Examiner* — Megan McCulley
(74) *Attorney, Agent, or Firm* — Thi Dang (57) ABSTRACT

A method for making engineered crosslinked thermoplastic particles, which are useful for interlaminar toughening of prepregs and composite materials.

6 Claims, 3 Drawing Sheets

ENGINEERED CROSSLINKED THERMOPLASTIC PARTICLES FOR INTERLAMINAR TOUGHENING

CROSS-REFERENCE TO RELATED APPLICATIONS

This application is a divisional application of U.S. application Ser. No. 12/787,719 filed on May 26, 2010, which claims priority to U.S. Provisional Application No. 61/182,302 filed on May 29, 2009, both of which are is incorporated herein by reference in their its entirety.

BACKGROUND OF THE INVENTION

Field of the Invention

Engineered crosslinked thermoplastic particles are useful for interlaminar toughening of composite materials.

Description of the Related Art

Various types of particles have been used to alter the properties of composite materials. In particular, un-crosslinked thermoplastic particles have been used in thermosetting resins but have been associated with various problems. One problem occurs as the concentration of thermoplastic increases. High concentrations of compatible or soluble thermoplastic particles in a resin, which might lead to their dissolution in the resin, causes the combination to be susceptible to phase inversion resulting in poor environmental resistance. Other problems occur with thermoplastic particles that dissolve during curing because the resulting composite does not retain sufficient of its thermosetting thermomechanical properties. Other insoluble particles do not allow the resin material to penetrate the particles causing a debonding between the particle and the resin, which does not confer sufficient strength to the composite material.

Engineered crosslinked thermoplastic particles, which are used in resin systems described herein, overcome these and other disadvantages of conventional particles.

SUMMARY OF THE INVENTION

The discovery detailed herein provides thermoplastic particles that have primary use as composite interleaf tougheners. The particles remain insoluble in resin systems upon curing, thereby increasing toughness and damage tolerance of composite articles. Composites prepared using such particles show 25% or greater increase in damage tolerance as compared to composites containing a dissolved form of the thermoplastic polymer. Additional characteristics enhanced by use of the thermoplastic particles of this invention in composite articles include reduced solvent sensitivity, improved hot wet properties, improved processing properties for prepregs, and resistance to micro-cracking.

Accordingly, the invention described in detail herein provides, in one aspect, a resin system including a plurality of engineered crosslinked thermoplastic particles and a thermosetting resin, wherein the engineered crosslinked thermoplastic particles are substantially insoluble in the thermosetting resin upon curing, and wherein the engineered crosslinked thermoplastic particles are capable of swelling in the thermosetting resin upon curing.

In another aspect, the invention provides an engineered crosslinked thermoplastic particle having a thermoplastic polymer backbone and a crosslinking agent crosslinked to the thermoplastic polymer backbone, wherein the crosslinking agent has a reactivity of two or greater than two, wherein the crosslinking agent is reactive with the functional groups of the thermoplastic polymer backbone, wherein the thermoplastic backbone is chemically crosslinkable, wherein the engineered crosslinked thermoplastic particle is substantially insoluble in the thermosetting resin upon curing, wherein the engineered crosslinked thermoplastic particle is capable of swelling upon curing, and wherein the epoxy resin is capable of diffusing into the engineered crosslinked thermoplastic particle.

In still another aspect, the invention provides prepregs, composites, and fibre performs including the resin systems and engineered crosslinked thermoplastic particles described in detail herein.

The invention also includes methods of manufacturing the engineered particles described herein by dissolving the thermoplastic polymer(s) and cross-linking agent, in a suitable solvent, forming an emulsion by mixing the polymer/solvent mixture with an immiscible solution in the presence of one or more stabilizer, stripping the solvent out of the emulsion to form solid particles, and curing the solid particles thereby cross-linking the polymer chains in the particles.

These and other objects, features and advantages of this invention will become apparent from the following detailed description of the various aspects of the invention taken in conjunction with the accompanying Figures and Examples.

BRIEF DESCRIPTION OF THE DRAWINGS

FIG. 1a illustrates a higher thermoplastic concentration towards the core of a more highly crosslinked particle, while FIG. 1b illustrates a lower thermoplastic concentration in the core of a less highly crosslinked particle.

FIG. 4a illustrates the behaviour of crosslinked compatible particles, and FIG. 4b illustrates that of PPO modified resin. Cracks are only observed on the sample with conventional thermoplastic particles.

DETAILED DESCRIPTION OF THE PREFERRED EMBODIMENT

Novel polymeric particles described herein may be used in the interlaminar resin-rich region of a thermosetting matrix composite to improve mechanical properties such as CAI, $G_{IC}$, $G_{IIC}$, OHC etc. In some embodiments, the particles contain thermoplastic polymers that fulfill at least two different criteria. For instance, the thermoplastic polymers are simultaneously thermodynamically compatible with a thermosetting resin such as an epoxy resin and they are chemically crosslinked in order to prevent their dissolution in the resin. Their crosslinking level affects the diffusion of the uncured thermosetting resin into the particles. One advantage includes strong bonding and good stress transfer between the particles and the resin matrix due to generating particles presenting a gradient interphase with the surrounding resin matrix. Another advantage of the crosslinked particles includes imparting improved resistance to solvents and microcracking in the composite material. The particles deliver increased toughness (compression after impact (CAI), fracture toughness or delamination resistance in mode I and II ($G_{IC}$, $G_{IIC}$)) to the composite without impacting severely hot-wet and fluid sensitivity properties. Additional benefit of the technology is the ability to tailor the properties of the particles to specific epoxy resin formulations. The particles, compositions comprising the particles, and associated methods and the related advantages will be discussed below in more detail.

Early work relating to particles for toughening composite materials included functionalised rubber particles such as carboxyl terminated rubber or rubber-type polymers such as polysiloxanes. These rubber particles are also claimed to be crosslinked, possibly by "in-situ" formation by RIPS (resin-induced phase separation) as commonly described. However, due to thermodynamic incompatibility of rubber with the resin matrix, there is no diffusion of the matrix resin into the rubber particles, unlike some embodiments of particles described herein.

Later developments in 1991, 1998 included thermoplastic particles such as the nylon particles from Toray. Toray and Amoco often based thermoplastic particles on polyamides such as the TN particles from Toray or some Nylon 12 from Amoco. Many thermoplastics are not soluble in thermosetting resins due to their intrinsic immiscibility with such resins. The use of core-shell particles and hybrid particles (inorganic/organic) in thermosetting resins was introduced in the late 1990s.

Nylon particles have also been used to toughen the interlaminar region of composites. The effects of the particles' diameter, the thickness of the interply region and the ductility of the matrix resin have been studied. More recently, the "toughening particles" include nano-particles such as the core-shell nano-particles, which are unable to create a gradient interface with the resin unlike the particles of embodiments described herein.

Some embodiments of the present invention are based on the design of a gradual and strong interface between the particles and the surrounding matrix by using a thermodynamically compatible thermoplastic that is crosslinked to prevent its dissolution yet allowing its swelling in the resin.

The term "thermoplastic" as used herein has its ordinary meaning as known to those skilled in the art and includes the thermoplastic that comprises the thermoplastic polymer backbone in the engineered crosslinked thermoplastic particle. In some aspects, the thermoplastic is chemically crosslinkable via the backbone and/or end-groups. In some embodiments, the thermoplastic may be one or more of a poly ether sulfone (PES), poly ether ether sulfone (PEES), polyetherimide (PEI), poly phenylene oxide (PPO), or a copolymer thereof, such as PES/PEES with various repeat unit ratios, PES homopolymers (such as PES 5003P from Sumitomo or Radel PES from Solvay polymers) or PEES homopolymers. One example of a thermoplastic backbone is HC99 manufactured by Cytec Engineered Materials, Inc., which is a proprietary amine ended PES/PEES thermoplastic. The thermoplastic polymer backbone may also comprise any aromatic polymer, copolymer or oligomer containing amid, imide, ester, ether, biphenyl, sulfide and carbonate linkages and any combination thereof.

In addition to the chemical structure of the polymer backbone, provided that the backbone and/or chain ends are reactive, the polymer molecular weight is another way to control the overall crosslink density of the particles. In the case where the crosslinking occurs through the polymer chain ends, shorter molecules will be able to achieve a higher maximum crosslink density. The thermoplastic may be a polymer or a pre-polymer. A polymer may comprises a molecule containing a sufficiently high number of chemically linked monomeric units to exhibit chain-entanglement whereas the equivalent prepolymer may comprise the same chemically linked monomeric units but not of a sufficiently high number to exhibit chain-entanglement. In some embodiments, the molecular weight of the thermoplastic is about 3,000-100,000 g/mol, such as a molecular weight of 3,000 to 40,000 g/mol; more typically 3,000 to 20,000 g/mol.

The percentage of reactive pendant and chain ends and their type/reactivity is another parameter that controls the particles' final properties such as crosslinking density. In some embodiments, reactive amine end groups are used as they show a good reactivity towards some crosslinking agents. Hydroxyl, carboxyl, methylol, glycidyl, anhydride, vinyl and diene groups are also reactive and offer a wide range of reactivity levels with different crosslinking agents. The nature of reactive groups may be one or more of the following: amine, hydroxyl, anhydride, glycidyl, carboxylic acid, maleimide, nadimide, cyanate ester, acetylene, vinyl or diene; in some cases, unsaturations on the polymer chain might serve as crosslinking points (for acrylic and methacrylic family as well some insaturated rubbers, vinyl esters or unsaturated polyesters).

In some embodiments, the number of reactive groups may be a minimum of 1 reactive group per chain and, in some embodiments, is considered as the lowest fraction necessary to create a connected polymer backbone; a number around or greater than 1.5 is preferred to produce a tightly crosslinked polymer. Polymers with functionalities greater than 2 will easily produce highly reacted gels. The term "engineered crosslinked thermoplastic particle" as used herein may have its ordinary meaning as known to those skilled in the art and may include a thermoplastic polymer backbone, which is crosslinked, for instance with a crosslinking agent. In some embodiments, the engineered crosslinked thermoplastic particle is thermodynamically compatible with a thermosetting resin. In further embodiments, the engineered crosslinked thermoplastic particle is not capable of substantially dissolving in the thermosetting resin. However, the engineered crosslinked thermoplastic particle is capable of swelling in uncured thermosetting resin precursors. Upon reaching and exceeding a specific onset temperature, which is specific to the properties of the particles, the particles present in the thermosetting resin will begin to swell due to the absorption of the resin's monomeric and oligomeric species. If the particles swell excessively at a low temperature, such as the temperature at which the particles and the resin are blended, the viscosity may increase such that fibers (such as carbon fibers) are difficult to impregnate with the resin/particle combination. In some embodiments, the resin/particle combination is heated to a temperature greater than the blending temperature for the diffusion of the resin into the particle to take place. The absorbed monomers subsequently react within the particles during the regular cure of the resin. Thus, "not capable of substantially dissolving" or "substantially insoluble" does not exclude the ability of the particle to swell when present in the resin. "Substantially dissolving" or "substantially soluble" includes forming a substantially homogeneous combination.

In some embodiments, the crosslinked particles for interlaminar toughening have good compatibility with thermosetting resins such as epoxies and insolubility in such monomers due to chemical crosslinking. In one aspect, particles comprising a copolymer based on PES (polyether sulfone) and PEES (polyether ether sulfone) repeat units shows excellent compatibility with epoxy systems, and especially those that are cured with aromatic amines such as 4,4' diaminodiphenylsulfone (DDS).

The extent of crosslinking in a particle may be measured using tests such as sol/gel fraction and the extent of swell in a monomeric epoxy resin, as discussed in detail in Example 2 below.

In some aspects, the thermoplastic particle does not comprise an elastomer or rubber. Elastomer or rubber is known by one of skill in the art and includes polymers whose glass transition temperature is below 25° C. or below room temperature, such as polybutadiene, polyisoprene, polybutylacrylate, polysiloxane, Ethylene Propylene Diene (EDPM), butadiene acrylonitrile etc. In some aspects, the engineered crosslinked thermoplastic particle forms a gradient interface upon formulation with thermosetting resins such as an epoxy resin.

The engineered cross-linked thermoplastic particles may have an average particle size of about 1 to 100 μm before curing of the composite; typically about 40 μm. They may be substantially spherical. The particle size will increase in the final and cured product due to the swell of the particles. In certain embodiments the average particle size in the final and cured particle can be from about 5 μm to about 40 μm. The term "crosslinking agent" as used herein may have its ordinary meaning as known to those skilled in the art and may include any crosslinking agent that enables the thermoplastic polymer to become crosslinked, wherein the crosslinking agent is reactive with groups on the thermoplastic polymer or with some functionalities present on its backbone. In some embodiments, the crosslinking agent has a reactivity of two or greater than two. In other embodiments, the crosslinking agent is miscible with the thermoplastic polymer backbone. In other embodiments, the crosslinking agent is not miscible with the thermoplastic polymer, for example, if the reaction is conducted in solution using a common solvent to the thermoplastic polymer and crosslinking agent. Examples of thermoplastic polymers that are susceptible to be crosslinked for this application are: polyethersulfones (PES) with hydroxyl ends, polyetherimides (PEI) whether hydroxyl ended, amine ended or anhydride ended, polyphenyleneoxides (PPO or polyphenylene ether PPE) with hydroxyl ends, polyaryletherketones (including PAEK, PEEK, PEKK) with fluoro or hydroxyl ends or any engineering polymers with reactive end group or main chain functionalities. Depending on the chemical nature of the polymer end groups/functionalities, an appropriate polyfunctional crosslinking agent can be selected. Examples of such crosslinking agents are: alkylated melamine derivatives (e.g. Cymel 303), acid chlorides (e.g. 1,3,5 benzenetricarbonyl trichloride), multi-functional epoxies (e.g. MY0501, MY721), carboxylic acids (1,2,4,5-benzenetetracarboxylic acid). Polyunsaturated thermoplastic polymers can also be easily crosslinked using radical addition using heat, UV or other radiation curing technique.

Examples of crosslinking agents include melamine derivatives widely used in the coatings industry, such as Cymel®350 manufactured by Cytec Industries, which has an average of about 4.4 multiple reactive sites; a highly methylated melamine resin such as Cymel®303 manufactured by Cytec Industries, which has an average of about 4.9 multiple reactive sites and has the following structure a highly alkylated glycoluril resin such as Cymel®1170 manufactured by Cytec Industries, which has an average of about 2.9 multiple reactive sites and has the following structure a resin that contains a tetrakis(methoxymethyl) glycoluril such as Powderlink®1174 resin, which has an average of about 3.25 multiple reactive sites having the chemical name imidazo[4,5-d]imidazole-2,5(1H,3H)-dione tetrahydro-1,3,4,6-tetrakis(methoxymethyl). In this embodiment, the proportion of the crosslinking agent to the thermoplastic backbone may be about 2 to about 15%, such as from about 4 to about 13%, by weight of the formulation. Typical amounts of crosslinking agent are about 6-8% of the combined weight of the formulation. The proportion of crosslinking agent to the thermoplastic backbone may be different for other types of crosslinking agents, and can be determined by those of skill in the art using methods requiring no more than routine experimentation.

The engineered crosslinked thermoplastic particle may be manufactured using a catalyst for the crosslinking reaction. The term "catalyst" as used herein may have its ordinary meaning as known to those skilled in the art and may include acid catalysts such as p-toluene sulfonic acid, or a strong sulfonic acid catalyst such as Cycat®500 manufactured by Cytec Industries.

Methods of making engineered crosslinked thermoplastic particles are also contemplated. In some embodiments, the method comprises drying an emulsion of a thermoplastic polymer, a crosslinking agent, and a catalyst and curing the dried powder. The method may also comprise dissolving the thermoplastic polymer, the crosslinking agent, and the catalyst in a solvent, which may be immiscible with water in the presence of a non-ionic surfactant which may be made into an emulsion using water. The reacting conditions and the type and level of crosslinking agent will determine the final properties of the particles. Reacting conditions such as temperature result in greater crosslinking. Crosslinking agents with greater functionality will affect the extent of the crosslinking of the thermoplastic particles. Other crosslinking agents with relatively lower functionality will crosslink to a lesser extent. The crosslinking agent concentration will also be directly proportional to the extent of crosslinking.

The terms "matrix," "resin," and "matrix resin" as used herein have their ordinary meaning as known to those skilled in the art and may include one or more compounds comprising thermoset materials. Engineered crosslinked thermoplastic particles may be combined with thermosetting resins such as epoxy resins, which are useful in making composite materials. The term "thermosetting resin" as used herein may have its ordinary meaning as known to those skilled in the art and may include epoxies, imides (e.g., polyimides (PMR15), bismaleimide (BMI)), cyanateesters, benzoxazines, phenol-formaldehyde resins, epoxy-acrylate and epoxy-methacrylate resins, polyester resins, vinylester resins, combinations thereof, and precursors thereof. In some embodiments, the thermosetting resin comprises monomers and/or low molecular weight liquid, which, when resin is heated and its viscosity is low the resin is absorbed by the engineered crosslinked thermoplastic particles that swell. In some embodiments, the resin cures in the particle. In some embodiments, the resin is capable of causing the engineered crosslinked thermoplastic particle to swell.

The terms "cure" and "curing" as used herein have their ordinary meaning as known to those skilled in the art and may include polymerizing and/or crosslinking processes. Curing may be performed by processes that include, but are not limited to, heating, exposure to ultraviolet light, and exposure to radiation. Prior to curing, the matrix may further comprise one or more compounds that are, at about room temperature, liquid, semi-solid, crystalline solids, and combinations thereof. In further embodiments, the matrix within the prepreg may be partially cured in order to exhibit a selected stickiness or tack and/or flow properties.

Compositions of engineered crosslinked thermoplastic particles and resins are useful in making pre-pregs. In addition, engineered crosslinked thermoplastic particles may be used in liquid molding processes, such as injection molding. The term "prepreg" as used herein has its ordinary meaning as known to those skilled in the art and thus includes sheets or lamina of fibers that have been impregnated with a matrix material within at least a portion of their volume. The matrix may be present in a partially cured state.

The term "fiber" as used herein has its ordinary meaning as known to those skilled in the art and may include one or more fibrous materials adapted for the reinforcement of composites. Fibers may take the form of any of particles, flakes, whiskers, short fibers, continuous fibers, sheets, plies, and combinations thereof. Continuous fibers may further adopt any of unidirectional, multi-dimensional (e.g. two- or three-dimensional), non-woven, woven, knitted, stitched, wound, and braided configurations, as well as swirl mat, felt mat, and chopped mat structures. Woven fiber structures may comprise a plurality of woven tows having less than about 1000 filaments, less than about 3000 filaments, less than about 6000 filaments, less than about 12000 filaments, less than about 24000 filaments, less than about 48000 filaments, less than about 56000 filaments, less than about 125000 filaments, and greater than about 125000 filaments. In further embodiments, the tows may be held in position by cross-tow stitches, weft-insertion knitting stitches, or a small amount of resin, such as a sizing.

The composition of the fibers may be varied, as necessary. Embodiments of the fiber composition may include, but are not limited to, glass, carbon, aramid, quartz, basalt, polyethylene, polyester, poly-p-phenylene-benzobisoxazole (PBO), boron, silicon carbide, polyamide, carbon, and graphite, and combinations thereof. In one embodiment, the fiber is carbon, fiberglass, aramid or other thermoplastic materials. The reinforcing fibers may be organic or inorganic. Further, the fibers may include textile architectures including those that are either continuous or non-continuous in form.

The term "layup" as used herein has its ordinary meaning as known to those skilled in the art and may include one or more prepregs that are placed adjacent one another. In certain embodiments, the prepregs within the layup may be positioned in a selected orientation with respect to one another. In a further embodiment, the prepregs may optionally be stitched together with a threading material in order to inhibit their relative motion from a selected orientation. In additional embodiments, "layups" may comprise any combination of fully impregnated prepregs, partially impregnated prepregs, and perforated prepregs as discussed herein. Layups may be manufactured by techniques that may include, but are not limited to, hand layup, automated tape layup (ATL), advanced fiber placement (AFP), and filament winding.

In some liquid molding embodiments, the particles may be pre-dispersed in a preform containing fibers without resin. The term "preform" or "fiber preform" as used herein has its ordinary meaning as known to those skilled in the art and may include an assembly of fibers, such as unidirectional fibers and woven fabrics, that are ready for receiving resin.

Selecting the appropriate thermoplastic polymer ensures the chemical compatibility (that is, thermodynamic compatibility) with the surrounding thermosetting matrix without the risk of particles dissolving into the resin. The chemical compatibility of the thermoplastic particles with the matrix promotes the diffusion of controlled amounts of the liquid resin into the particles increasing significantly the bonding of the particles with the resin. The benefit of the chemical compatibility does not come at the expense of the dissolution or leaching of thermoplastic into the resin due to the crosslinked nature of the particles, as discussed below in more detail. In some embodiments, the resin can diffuse into the particles and not the contrary, such that the particles will retain their mechanical integrity during the blending and curing process of the resin. Retaining some of their initial strength throughout the whole mixing, handling and curing of the prepregs enables the creation of a resin-rich area between plies, which is known to confer improved delamination resistance to the cured composite. Without the chemical compatibility, which confers a strong interface between the inclusion (particle) and the matrix, debonding and particle delamination are frequently observed. The lack of compatibility often leads to premature micro-cracking initiated at the interface between the particles and matrix.

Compatibility may be determined by measuring or calculating the Hansen or Hildebrand solubility parameters of the polymer and the resin but these calculations or measurements are cumbersome. Therefore, hot stage microscopy may be used. In this method, particles are mixed with different types of resins and then heated under a microscope to determine whether the particles interact with the resin or swell. In some embodiments, the resin is heated to 120° C. usually in order to be at around its point of minimum viscosity. In addition, diffusion speed is increased by temperature on an Arhenius basis. This is implemented to reduce the testing time, but also to simulate better the real conditions during a curing process.

Another benefit of embodiments of the invention is the ability to achieve locally high concentration of thermoplastic in the interlaminar region without facing the risk of obtaining a phase inverted system. The thermoplastic content in the interlaminar region is known to increase the toughness of the material. However, when large quantities of linear compatible thermoplastic are blended with a thermosetting resin, the blend is known to phase separate during the cure of the resin, also known as reaction induced phase separation, leading to a thermoplastic continuous phase with inclusions of thermosetting polymer. This phase inversion, in turn, is severely detrimental to the properties of the composite, primarily for temperature resistance and solvent resistance. Embodiments of the engineered crosslinked thermoplastic particles do not cause phase inversion. High thermoplastic content may be achieved, therefore, without compromising the temperature or solvent resistance of the material.

In composites, the engineered crosslinked thermoplastic particles are capable of achieving a much higher local concentration than un-crosslinked thermodynamically compatible counterparts. For example, a local concentration of engineered crosslinked thermoplastic particles may be approximately 10-50 weight percent of the resin composition in the interlaminar region. "Local concentration" is a qualitative term and refers to the weight or volume fraction of each component in the interlaminar region. The interlaminar region is the portion of a composite material that comprises the resin-rich region of a composite between layers of fibers such as carbon fiber. The local concentration is achieved without phase inversion, or without forming a thermoplastic with thermoset inclusions. In some embodiments, the composite structure is a thermoset with thermoplastic inclusions.

In some embodiments, the temperature resistance of the composite material is about 80-350° C. Conventionally, temperature resistance is measured by the process of measuring the modulus reduction with increased temperature (using for instance Dynamic Mechanical Thermal Analysis or DMTA) or measuring the glass transition temperature of the material by Differential Scanning calorimetry. In other embodiments, the solvent resistance of the composite material is about 0-15%. Conventionally, solvent resistance is measured by the process of measuring the solvent weight uptake versus time.

Figure 1A:
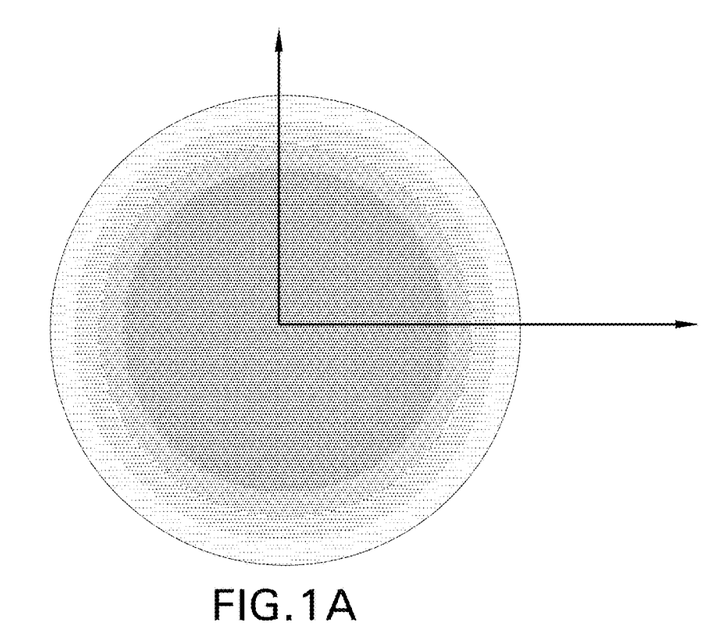
FIGS. 1a and 1b illustrate the evolution of a particle's properties after the matrix monomers have diffused into a particle.
Figure 1B:
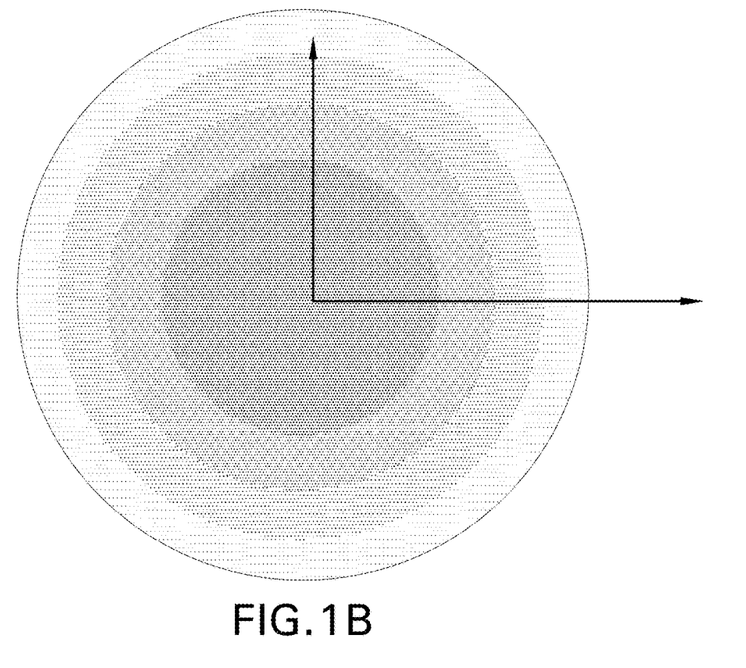

The term "gradient interface" as used herein has its ordinary meaning as known to those skilled in the art and relates to the gradual and strong interface between each of the particles and the surrounding resin matrix. A gradient interface is achieved by using engineered crosslinked thermoplastic particles that are thermodynamically compatible with the resin. As shown in FIGS. 1a and 1b, the concentration of thermoplastic in the core of a thermoplastic particle containing a resin is greatest at the center and gradually decreases towards the outer surface of the particle as the matrix enters the particle from the outer surface and moves towards the core. This gradual decrease in the thermoplastic concentration from the core to the outer surface of the thermoplastic particle forms the gradient interface between each of the thermoplastic particles and the surrounding resin. Thus, there is no sharp transition between the thermosetting resin and the thermoplastic particle. If a sharp transition was present, the interface between the thermoplastic and the thermosetting resin would be much weaker in a composite material in comparison to a composite material containing a gradient interface.

In other embodiments, the particles become completely swollen and therefore the gradient of properties within/throughout the particles become close to zero. The particles may be no longer thermoplastic or thermosets. This results may happen with particles that are loosely crosslinked, or in a resin that has a low viscosity and that is thermodynamically close to the polymer. During the cure of the thermosetting resin, due to the rapid diffusion of the low molecular weight resin, the particles will have time to become fully swollen.

In other embodiments, particles include "layered particles" such as but not limited to core-shell structures, where the swell ability of each layer is independently controlled through the manufacturing of the particles. In some aspects, each layer may swell to a different extent in comparison to a neighboring layer. "Thermodynamic compatibility" may be achieved by using thermoplastic that is crosslinked to prevent its dissolution in the resin but which swells in the resin. A thermoplastic is soluble in a resin if it becomes fully homogenized during the preparation of a composite material. Thus, in some embodiments, thermoplastic particles are not fully homogenized during the preparation of a composite material. Although one may be able to predict in some circumstances whether or not thermoplastic particles are compatible with the resin, one way to test whether thermoplastic particles are thermodynamically compatible with resin is to combine particles with a resin to determine whether the resin swells the particles without dissolving them and to prepare a cured material to determine whether the particles maintain themselves as discrete particles after curing. Examples of thermoplastic particles that are thermodynamically compatible with epoxy resin include polyetherimide, polysulfone, polyethersulfone.

The term "discrete particle" as used herein has its ordinary meaning as known to those skilled in the art and includes particles which are discernible in the interlaminar region, and which may be detected by using Scanning Electron Microscopy (SEM), Optical Microscopy, Differential Interference Contrast microscopy (DIC).

Another advantage of this enhanced gradient interface is the ability of the stress to be efficiently transferred between the particles and the surrounding matrix. The stress transfer ability relates to the fullest toughening properties of the particles. Many complex mechanisms have been identified in the past, many of them based on the assumption that the stress introduced in the material is transferred into the particles so that plastic deformations and other energy consuming mechanisms can happen effectively. Furthermore, an inefficient stress transfer would also result in reduced stiffness and strength of the matrix, which would translate into a reduced elastic modulus of the matrix.

Composite material including the engineered crosslinked thermoplastic particles has the ability to transfer stress efficiently between the particles and the surrounding resin matrix. The stress transfer ability may be measured by photoelasticity.

A further benefit of engineered crosslinked thermoplastic particles is improved lifecycle performance of the composite material in comparison to the same composite material with different particles or without the engineered crosslinked thermoplastic particles. Whereas conventional resins blended with a high concentration of thermoplastic would suffer from crazing or micro-cracking after repeated thermal or mechanical cycles, resins modified with crosslinked particles advantageously sustain cyclic testing more robustly, due to the particles' crosslinked nature and the presence of thermoset resin within the particles.

Composite materials incorporating the engineered crosslinked thermoplastic particles have improved mechanical properties such as compression after impact (CAI or CSAI), fracture toughness or delamination resistance in mode I and II ($G_{IC}$ and $G_{IIC}$ respectively) OHC (Open Hole Compression). CAI (or CSAI) measures the ability of a laminate/composite material to tolerate damage. According to this method the laminate to be tested is subject to an impact of a given energy prior to be loaded in compression. The laminate is constrained during the test to ensure that no elastic instability is taking place. The strength of the laminate is recorded. The benefit of interlaminar toughening particles is primarily noticed in the properties of the material that involve fracture, such as CAI, $G_{IC}$ and $G_{IIC}$, $K_{IC}$ and $K_{IIC}$ as exemplified in Examples 3-4 below. $K_c$ and $G_c$ represent the fracture toughness, which is a property that describes the ability of a material containing a crack to resist fracture. K is a representation of the stress intensity factor whilst G is the fracture energy.

In some embodiments, high Tg composite materials (e.g., Tg of at least 180° C.) are fabricated so that the neat resin materials in the interlaminar region may have a $K_{IC}$ of at least about 0.8 to about 3 MPa·m$^{0.5}$ (typically between 0.9 and 1.1), and a $G_{IC}$ of at least about 200 to about 500 J/m$^2$ (typically about 250 J/m$^2$).

In addition, the concept of preformed particle toughening can be exploited in other areas where toughening is required, this includes but is not limited to adhesive formulations, primary and secondary structure thermosetting formulation.

$K_{IC}$ and $G_{IC}$ of the cured resin can be measured by LEFM (Linear Elastic Fracture Mechanics) as described in Example 3 in more detail.

In one aspect, resin modified with engineered crosslinked thermoplastic particles sustains cyclic testing. Such testing comprises the subjecting of composite material comprising the modified resin to repeated thermal or mechanical cycles and then measuring the presence of crazing or micro cracking. The presence and extent of micro-cracking is usually carried out by SEM analysis, reporting the number of observable micro-cracks per unit length.

Another advantage of using crosslinked particles includes the ability to tailor their properties by controlling their crosslink density, such as by changing the crosslinker concentration and hence the crosslinking degree in the particles, which also makes it possible to tailor the swell factor of the particles. This tailoring ability is significant when considering the numerous variants of resins consisting of blends of monomers that may interact differently with thermoplastic particles. Having the ability to easily tailor the properties of the particles provides a powerful tool to the resin formulator and also ensures that toughening particles are exploited fully. For instance, as the swelling of the particles increases, the thermoplastic properties that are conferred to the composite material decrease.

Thus, methods of tailoring the properties of the particles to achieve properties and specific epoxy resin formulations are also contemplated. A method for tailoring the properties of the particles may include the steps of measuring the speed and extent of diffusion of a specific resin formulation and assessing consequently the appropriate particle crosslink density to specifically suit the formulation The terms "approximately," "about," and "substantially" as used herein represent an amount close to the stated amount that still performs the desired function or achieves the desired result. For example, the terms "approximately," "about," and "substantially" may refer to an amount that is within less than 10% of, within less than 5% of, within less than 1% of, within less than 0.1% of, and within less than 0.01% of the stated amount. The term "at least a portion of" as used herein represents an amount of a whole that comprises an amount of the whole that may include the whole. For example, the term "a portion of" may refer to an amount that is greater than 0.01% of, greater than 0.1% of, greater than 1% of, greater than 10% of, greater than 20% of, greater than 30% of, greater than 40% of, greater than 50% of, greater than 60%, greater than 70% of, greater than 80% of, greater than 90% of, greater than 95% of, greater than 99% of, and 100% of the whole.

OTHER EMBODIMENTS

1. A resin system comprising
a plurality of engineered crosslinked thermoplastic particles;
a thermosetting resin;
wherein the engineered crosslinked thermoplastic particles are substantially insoluble in the thermosetting resin upon curing; and
wherein the engineered crosslinked thermoplastic particles are capable of swelling in the thermosetting resin upon curing.

2. The resin system as in embodiment 1
wherein the thermosetting resin is capable of diffusing into the engineered crosslinked thermoplastic particle.

3. The resin system as in embodiment 1 or 2
wherein the plurality of the engineered crosslinked thermoplastic particles form a gradient interface with the resin upon curing.

4. The resin system as in any one of embodiments 1-3
wherein the thermosetting resin in the engineered crosslinked thermoplastic particles is capable of reacting upon curing.

5. The resin system as in any one of embodiments 1-4
wherein the engineered crosslinked thermoplastic particles are discrete particles upon curing.

6. The resin system as in any one of embodiments 1-5
wherein the engineered crosslinked thermoplastic particles are capable of achieving a higher concentration than un-crosslinked thermoplastic particles in an interlaminar region of a composite upon curing without phase inversion.

7. The resin system as in any one of embodiments 1-6
wherein the engineered crosslinked thermoplastic polymer comprises crosslinked poly ether sulfone (PES), crosslinked poly ether ether sulfone (PEES), crosslinked poly etherimide (PEI), crosslinked poly phenylene oxide (PPO), or a crosslinked copolymer thereof.

8. The resin system as in any one of embodiments 1-7 further comprising fiber;
wherein the particles maintain an interlaminar gap between layers of the fiber upon curing.

9. The resin system as in any one of embodiments 1-8
wherein the engineered crosslinked thermoplastic particles comprise:
a thermoplastic polymer backbone;
a crosslinking agent crosslinked to the thermoplastic polymer backbone;
wherein the crosslinking agent has a reactivity of two or greater than two; and
wherein the crosslinking agent is reactive with functional groups of the thermoplastic polymer backbone.

10. The resin system as in embodiment 9
wherein the engineered crosslinked thermoplastic particle is thermodynamically compatible with an epoxy resin upon curing; and
wherein the engineered crosslinked thermoplastic particle is chemically crosslinkable;
wherein the engineered crosslinked thermoplastic particle is capable of forming a gradient interface with the thermosetting resin; and wherein the thermosetting resin is capable of diffusing into the engineered crosslinked thermoplastic particle.

11. The resin system as in any one of embodiments 1-10 wherein the crosslinking agent is miscible with the thermoplastic polymer backbone; and
wherein the thermoplastic polymer backbone is selected from the group consisting of poly ether sulfone (PES), poly ether ether sulfone (PEES), poly etherimide (PEI), poly phenylene oxide (PPO), or a copolymer thereof.

12. A prepreg comprising the resin system of any one of embodiments 1-11.

13. A composite comprising the resin system of any one of embodiments 1-11.

14. A engineered crosslinked thermoplastic particle comprising
a thermoplastic polymer backbone;
a crosslinking agent crosslinked to the thermoplastic polymer backbone; and
wherein the crosslinking agent has a reactivity of two or greater than two;
wherein the crosslinking agent is reactive with the functional groups of the thermoplastic polymer backbone;
wherein the thermoplastic backbone is chemically crosslinkable;
wherein the engineered crosslinked thermoplastic particle is substantially insoluble in the thermosetting resin upon curing;
wherein the engineered crosslinked thermoplastic particle is capable of swelling upon curing; and
wherein the epoxy resin is capable of diffusing into the engineered crosslinked thermoplastic particle.

15. The engineered crosslinked thermoplastic particle according to embodiment 14, wherein the thermoplastic polymer backbone is selected from the group consisting of poly ether sulfone (PES), poly ether ether sulfone (PEES), poly etherimide (PEI), poly phenylene oxide (PPO), or a copolymer thereof.

16. The engineered crosslinked thermoplastic particle according to embodiment 14 or 15, wherein the crosslinking agent is miscible with the thermoplastic polymer backbone.

17. The engineered crosslinked thermoplastic particle according to any one of embodiments 14-16, wherein the engineered crosslinked thermoplastic particle is capable of forming a gradient interface with a thermosetting resin.

18. The engineered crosslinked thermoplastic particle according to any one of embodiments 14-17 further comprising a catalyst.

19. The engineered crosslinked thermoplastic particle according to any one of embodiments 14-18,
wherein the crosslinked thermoplastic particle contains two or more layers.

20. The engineered crosslinked thermoplastic particle according to any one of embodiments 14-19
wherein the polymer molecular weight of the thermoplastic polymer backbone is about 3,000-50,000 g/mol.

21. A method of making the engineered crosslinked thermoplastic particle according to any one of embodiments 14-20 comprising
drying and curing an emulsion of a thermoplastic polymer, a crosslinking agent, and a catalyst to form a engineered crosslinked thermoplastic particle.

22. The method of embodiment 21 further comprising dissolving the thermoplastic polymer, the crosslinking agent, and the catalyst in a solvent;
wherein the solvent is immiscible with water; and
wherein an emulsion is formed in water.

23. The method of embodiment 21 or 22 further comprising
forming an emulsion of the dissolved thermoplastic polymer, crosslinking agent, and catalyst with water in the presence of a non-ionic surfactant.

24. A kit comprising
one or more thermoplastic polymer or pre-polymer;
one or more crosslinking agents; and
an emulsion-forming reagent.

25. A treated preform comprising
a plurality of engineered crosslinked thermoplastic particles of any one of embodiments 14-20; and
a fiber preform;
wherein the engineered crosslinked thermoplastic particles are dispersed in the fiber preform.

EXAMPLES

The following examples are provided to assist one skilled in the art to further understand certain embodiments of the present invention. These examples are intended for illustration purposes only and are not to be construed as limiting the scope of the claims of the present invention.

Example 1—Method of Manufacturing Particles

Crosslinked engineered thermoplastic particles are produced in a emulsion process by dissolving the polymer, crosslinking agent, catalyst into a common solvent, which is immiscible with water. An emulsion is then created in water by using a non-ionic surfactant.

The emulsified particles are subsequently dried and cured so that the polymeric chains become chemically crosslinked and consequently insoluble forming a chemical 3D network.

The reacting conditions and the type and level of crosslinking agent will determine the final properties of the particles as described above.

When blended in a thermoset resin, once the resin temperature gets over a specific onset temperature (which is specific to the properties of the particles), the particles start to swell due to the absorption of the monomeric species. The absorbed monomers subsequently react in the particles during the regular cure of the resin.

This process results in thermoplastic-rich particles that exhibit a gradient composition profile at the interface. This engineered interface exhibits improved interfacial bonding properties. FIGS. 1a and 1b illustrate the evolution of the particles properties after the matrix monomers have diffused into the particles. A highly crosslinked particle (FIG. 1a) and a more loosely crosslinked particle (FIG. 1b) are compared. The x axis represents the distance away from the core particle and the y axis represents the thermoplastic concentration. Thus, FIG. 1a, includes a higher thermoplastic concentration towards the core of a more highly crosslinked particle, while FIG. 1b illustrates the lower thermoplastic concentration in the core of a less highly crosslinked particle.

A typical recipe to create such particles is given in Table 1 below.

TABLE 1

| | Typical quantity (g) | Useful range (g) |
|---|---|---|
| HC99 polymer | 65 | 65 |
| Cymel 350 | 5 | 3-10 |
| p-toluene sulfonic acid | 0.15 | 0.1-0.5 |

Cymel 350, shown below, is a melamine derivative that reacts via a condensation mechanism with hydroxyl and amine functional groups. The particularity of this molecule is that it possesses multiple reactive sites (average number of 4.4) that are required to create a crosslinked network. The structure also shows the condensation by nucleophilic attack of a primary amine functional group onto the carbon next to the methoxy group.

The reaction is further catalysed by the introduction of an acid catalyst such as p-toluene sulfonic acid. The likely reaction mechanism is shown below.

Several variants of the above formulation have been tested successfully. They include the use of alternative crosslinking agents as well as other catalysts.

TABLE 2

| | Typical quantity (g) |
|---|---|
| HC99 polymer | 65 |
| Cymel 303 | 5 |
| p-toluene sulfonic acid | 0.15 |

TABLE 3

| | Typical quantity (g) |
|---|---|
| HC99 polymer | 65 |
| Cymel 1170 | 5.53 |
| Cycat 500 | 0.5 |

TABLE 4

| | Typical quantity (g) |
|---|---|
| HC99 polymer | 65 |
| Powderlink 1174 | 3.14 |
| Cycat 500 | 0.5 |

Example 2—Method Characterizing Particles

The crosslinked particles may be characterized by two major tests: the sol/gel fraction and the extent of swell in a monomeric epoxy resin.

The first test is a simple procedure that provides an estimation of the amount of chemically crosslinked polymer in the particles. A known amount of particles is mixed into a suitable solvent, i.e. dichloromethane in the case of PILT-100 particles, and filtered to determine the gel fraction of the particles. Typical values are found to be around 70%. Commonly, particles are found in the range 50-99%.

The second test measures the ability of the particles to absorb monomeric resin such as epoxy monomers. A standard procedure consists in observing the swell behaviour of a set of approximately 10 particles, blended in a low viscosity epoxy resin such as MY0510, whilst the resin is heated to high temperature. The diameter of the particles when fully swollen by the monomer is compared to the original particle diameter and the swell factor is calculated. For practical reasons, the "reciprocal swell," i.e. Di/Df, is often reported.

Figure 2:
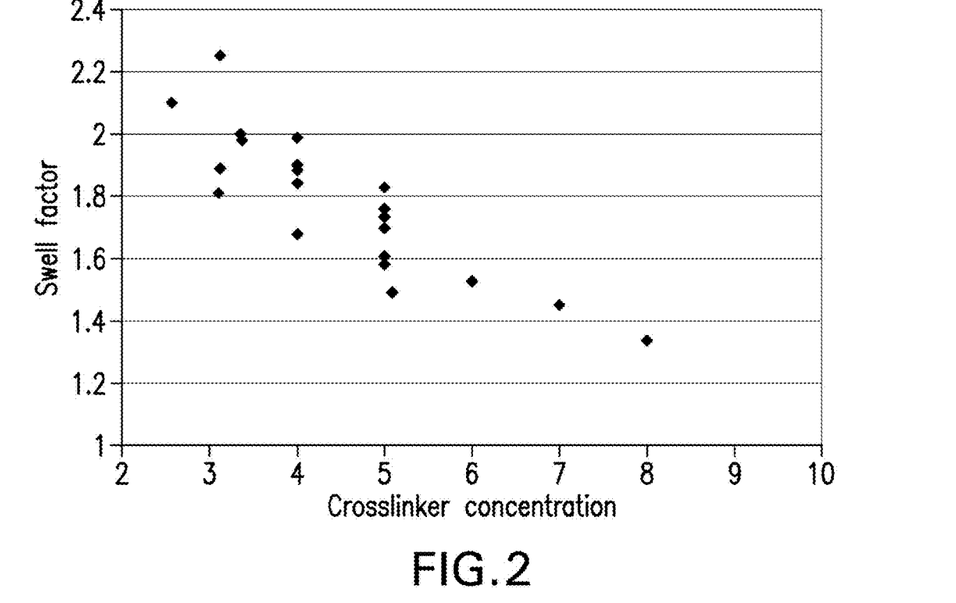
FIG. 2 illustrates the crosslinker concentration versus the swell factor of the particles.

By changing the crosslinker concentration and hence the crosslinking degree in the particles, it is possible to tailor the swell factor of the particles. This is illustrated in the graph of FIG. 2.

Example 3—Comparison of Fracture Resistance (Toughening) with Elastic Modulus The benefit of using particles with a gradient interphase is demonstrated in neat resins by evaluating the fracture resistance using Linear Elastic Fracture Mechanics (following the procedure recommended by the ESIS committee, "Fracture Mechanics Testing Methods for Polymers Adhesives and Composites," D. R. Moore, A. Pavan, J. G. Williams, ESIS publication 28, 2001, pp 11-26). Neat resin samples (without fibres) are prepared by conventional hot-mixing techniques and cast into moulds for curing. $K_{IC}$ and $G_{IC}$ are measured on the neat resin using LEFM, elastic modulus is determined by compliance measurements.

The resins evaluated are detailed below:

TABLE 5

| | Control 1 |
|---|---|
| MY0510 | 60% equivalent |
| PY306 | 40% equivalent |
| 44DDS | 80% equivalent |
| HC99 | 0% |
| PILT-100 | 0% |

TABLE 6

| | Control 2 |
|---|---|
| MY0510 | 60% equivalent |
| PY306 | 40% equivalent |
| 44DDS | 80% equivalent |
| HC99 | 30% |
| PILT-100 | 0% |

TABLE 7

| | 077-039B |
|---|---|
| MY0510 | 60% equivalent |
| PY306 | 40% equivalent |
| 44DDS | 80% equivalent |
| HC99 | 15% |
| PILT-100 | 15% |

MY 0510 is triglycidyl p-aminophenol TGAP (Araldite MY 0510) available from Ciba Geigy Corporation, Hawthorne, N.Y. PY306 is bisphenol F-based epoxy resin (Araldite PY306) available from Ciba Geigy (Japan) Limited. 44DDS is 4,4'-diaminodiphenyl sulfone. HC99 is a proprietary PES copolymer PILT-100 is the denomination of crosslinked particles produced according to the recipes described in this invention.

TABLE 8

| | $K_{IC}$ (MPa·m$^{0.5}$) | Kc std dev | $G_{IC}$ (kJ/m$^2$) | E (GPa) |
|---|---|---|---|---|
| Control 1 | 0.52 | 0.02 | 0.07 | 3.62 |
| Control 2 | 0.84 | 0.02 | 0.1999 | 3.48 |
| 077-039B | 1.01 | 0.01 | 0.309 | 3.53 |

Table 8 above shows that particles toughen the matrix without sacrificing the elastic modulus of the resin.

Example 4—Particle Stiffness

Figure 3:
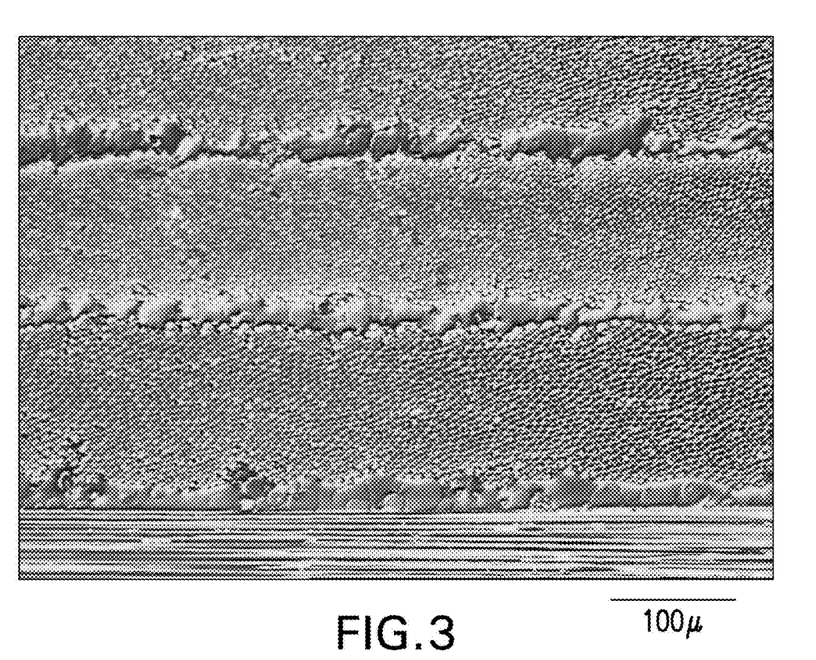
FIG. 3 illustrates an interlaminar gap created and maintained by particles, which retain sufficient stiffness, including when they are swollen by the surrounding thermosetting resin. Particles are visible in the resin rich areas, which divide the carbon fibre rich plies.

The level of crosslinking of the particles also ensures that the particles retain sufficient stiffness, including when they are swollen by the surrounding thermosetting resin, so that they are able to create and maintain an interlaminar gap. This behaviour is illustrated in FIG. 3. Particles are visible in the resin rich areas, which divide the carbon fibre rich plies.

Example 5—Compression after Impact (CAI) and Fracture Toughness ($G_{IIC}$) Measurements Typical composite formulations are illustrated below. The examples below show the difference in behaviour between crosslinked particles PILT-100, standard PPO (polyphenylene oxide) particles, and rubbery DP5045 particles in two different formulations.

TABLE 9

| | R11F3 |
|---|---|
| Carbon Fibre | T40-800 |
| MY721 | 50% equivalent |
| MY0610 | 50% equivalent |
| 33DDS | 100% equivalent |
| PES 5003P | 20% |
| PILT-100 | 10% |

TABLE 10

| | Control 1 R11F4 |
|---|---|
| Carbon Fibre | T40-800 |
| MY721 | 50% equivalent |
| MY0610 | 50% equivalent |
| 33DDS | 100% equivalent |
| PES 5003P | 20% |
| PPO | 10% |

TABLE 11

| | Control 2 R10F1 |
|---|---|
| Carbon Fibre | T40-800 |
| MY721 | 50% equivalent |
| MY0610 | 50% equivalent |
| 33DDS | 100% equivalent |
| PES 5003P | 20% |
| DP5045 | 5% |

TABLE 12

| | R11F11 |
|---|---|
| Carbon Fibre | T40-800 |
| MY721 | 40% equivalent |
| MY0610 | 20% equivalent |
| PY306 | 40% equivalent |
| 33DDS | 100% equivalent |
| PES 5003P | 20% |
| PILT-100 | 10% |

TABLE 13

| | Control 1 R11F12 |
|---|---|
| Carbon Fibre | T40-800 |
| MY721 | 40% equivalent |
| MY0610 | 20% equivalent |
| PY306 | 40% equivalent |
| 33DDS | 100% equivalent |
| PES 5003P | 20% |
| PPO | 10.0% |

TABLE 14

| | Control 2 R10F2 |
|---|---|
| Carbon Fibre | T40-800 |
| MY721 | 40% equivalent |
| MY0610 | 20% equivalent |
| PY306 | 40% equivalent |
| 33DDS | 100% equivalent |
| PES 5003P | 20% |
| DP5045 | 5.0% |

TABLE 15

| | CAI [ksi] |
|---|---|
| R11F3 | 42.17 |
| R11F4 | 40.94 |
| R10F1 | 43.5 |
| R11F11 | 43.95 |
| R11F12 | 43.86 |
| R10F2 | 41.6 |

TABLE 16

| | $G_{IIC}$ [1$^{st}$ crack] in-lb/in$^2$ |
|---|---|
| R11F3 | 10.59 |
| R11F4 | 9.74 |
| R10F1 | 4.1 |
| R11F11 | 12.15 |

TABLE 16-continued

| | $G_{IIC}$ [1$^{st}$ crack] in-lb/in$^2$ |
|---|---|
| R11F12 | 11.78 |
| R10F2 | 7.3 |

TABLE 17

| | IPSM (In-Plane Shear Modulus) | | |
|---|---|---|---|
| | Amb. | MEK | % Loss |
| R11F3 | 0.712 | 0.686 | 4% |
| R11F4 | 0.745 | 0.703 | 6% |
| R10F1 | | | 4% |
| R11F11 | 0.66 | 0.608 | 8% |
| R11F12 | 0.668 | 0.633 | 5% |
| R10F1 | | | 11% |

MY721 is tetraglycidyldiaminodiphenylmethane TGDDM (Araldite MY721) available from Ciba Geigy Corporation, Hawthorne, N.Y. MY0610 is 3-glycidyloxy-N,N-diglycidyl aniline or and Triglycidyl m-aminophenol (Araldite MY0610) available from Ciba Geigy Corporation, Hawthorne, N.Y. 33DDS is 3,3'-diaminodiphenyl sulfone. PES 5003P is phenol-terminated PES (5003P) available from Sumitomo Chemical Co. Ltd. (Osaka, Japan). PPO is polyphenylene oxide available from Sabic Innovative Plastics.

The fracture properties (CAI and $G_{IIC}$) indicate the value of the compatible crosslinked particles in controlling the initiation and propagation of cracks in the composite.

Figure 4A:
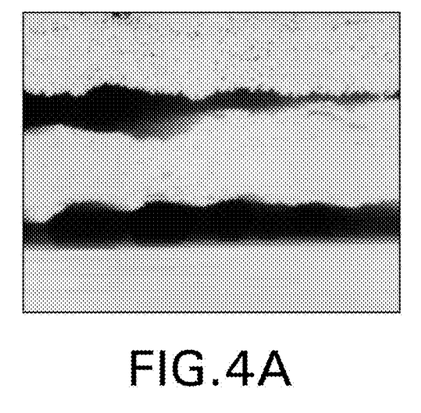
FIGS. 4a and 4b show composite interlaminar regions after solvent resistance testing under strain; microcracks are revealed by using fluorescent dyes.
Figure 4B:
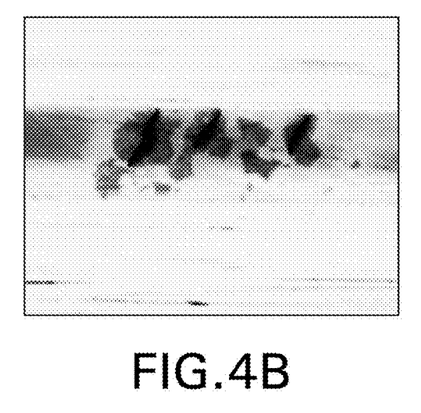

More importantly, the chemical and mechanical resistance of the engineered particles clearly outperforms the existing thermoplastics. This result is exacerbated on specimens that are tested for solvent sensitivity under strain. The micrographs in FIG. 4 illustrate the behaviour of plain PPO particles and particles developing a gradient interphase. It clearly shows that the regular PPO thermoplastic particles start developing microcracks whilst the crosslinked compatible particles show a much higher resistance to microcracking.

The compatibility of the particle with the matrix resin ensures a gradual stress build-up at the interface between the particles and the matrix, which controls the stress concentration at the interface of the particles. A sharp and abrupt interface found in conventional materials often leads to premature debonding of the particles, which subsequently can evolve into microcracks and early fracture of the material. In addition, the crosslinked nature of the polymer that is forming the particles significantly increases their toughness and their resistance to microcracking and crazing.

Examples 6 and 7—Preparation of Interleaf Particles by Direct Cross-Linking of Thermoplastic Polymers Using Different Functional Groups to Achieve the Cross Linking Examples 6 and 7 use the same general process as outlined in Example 1. The particle composition and results are summarized in Table 18. It is clearly indicated that the cross-linked particles give significantly higher toughness to the composite.

TABLE 18

| Interleaf particle cross-linked by Cymel and Epoxy resin | | | |
|---|---|---|---|
| | Example 6 | Example 7 | Comparative example |
| HC99 polymer | 570.70 | 571.2 | 600 |
| Cymel 350 | 29.32 | 0 | 0 |
| p-toluene sulfonic acid | 1.05 | 0 | 0 |
| Araldite MY 0510 | 0 | 28.8 | 0 |
| Cure condition | 4 hours @225 C. | 2 hours @200 C. | |
| Gel % | 80 | 80 | 0 |
| CAI (ksi) | 45.8 | 43.7 | 30.7 |

Various patent and/or scientific literature references have been referred to throughout this application. The disclosures of these publications in their entireties are hereby incorporated by reference as if written herein to the extent that such disclosures are not inconsistent with the invention and for all jurisdictions in which such incorporation by reference is permitted. In view of the above description and the examples, one of ordinary skill in the art will be able to practice the disclosure as claimed without undue experimentation.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A method of making engineered crosslinked thermoplastic particles, comprising:
    dissolving (i) a thermoplastic polymer having backbone or end functional groups, (ii) a polyfunctional crosslinking agent that is reactive with the functional groups of the thermoplastic polymer, and (iii) a catalyst in a solvent, which is immiscible with water, to form a polymer-solvent mixture;
    forming an emulsion of the polymer-solvent mixture with water in the presence of a non-ionic surfactant;
    removing the solvent from the emulsion to form solid particles; and
    curing the solid particles,
    wherein the thermoplastic polymer is selected from: poly ether sulfone (PES), poly ether ether sulfone (PEES), polyetherimide (PEI), poly phenylene oxide (PPO), and a copolymer thereof, and the functional groups on the thermoplastic polymer are selected from: amine, hydroxyl, anhydride, glycidyl, carboxylic acid, maleimide, nadimide, cyanate ester, acetylene, vinyl, and diene.

2. The method of claim 1, wherein the thermoplastic polymer is selected from: poly ether sulfone (PES), poly ether ether sulfone (PEES), and a copolymer thereof, and the crosslinking agent is selected from methylated melamine resins, alkylated glycoluril resins, and multifunctional epoxies.

3. The method of claim 2, wherein the functional groups on the thermoplastic polymer are amine or hydroxyl groups.

4. The method of claim 1, wherein the thermoplastic polymer is a copolymer of poly ether sulfone (PES) and poly ether ether sulfone (PEES).

5. The method of claim 1, wherein the catalyst is an acid catalyst.

6. The method of claim 5, wherein the catalyst is p-toluene sulfonic acid.

* * * * *